(12) United States Patent
Zai et al.

(10) Patent No.: US 7,982,585 B2
(45) Date of Patent: Jul. 19, 2011

(54) METHOD AND APPARATUS FOR ACTIVE RFID NETWORK

(76) Inventors: Li-Cheng Richard Zai, Los Gatos, CA (US); Xinyu Harry Zang, Sunnyvale, CA (US)

(*) Notice: Subject to any disclaimer, the term of this patent is extended or adjusted under 35 U.S.C. 154(b) by 1024 days.

(21) Appl. No.: 11/712,641

(22) Filed: Feb. 28, 2007

(65) Prior Publication Data
US 2008/0204193 A1 Aug. 28, 2008

(51) Int. Cl.
*H04Q 5/22* (2006.01)
*G06K 7/10* (2006.01)

(52) U.S. Cl. .............. 340/10.1; 340/10.2; 340/10.3; 340/10.4; 235/462.46

(58) Field of Classification Search .................. None
See application file for complete search history.

(56) References Cited

U.S. PATENT DOCUMENTS
6,542,114 B1 4/2003 Eagleson et al.
7,692,532 B2* 4/2010 Fischer et al. ............. 340/10.2
2006/0158313 A1* 7/2006 Satou ........................ 340/10.2
2006/0175407 A1* 8/2006 Kinoshita .................. 235/451

OTHER PUBLICATIONS

IEEE 802.15.4 Standard "Wireless Medium Access Control (MAC) and Physical Layer (PHY) Specifications for Low-Rate Wireless Personal Area Networks (LR-WPANS)", IEEE Computer Society, Oct. 1, 2003, 679 pages, New York, NY.

* cited by examiner

*Primary Examiner* — Davetta W Goins
*Assistant Examiner* — Fekadeselassie Girma
(74) *Attorney, Agent, or Firm* — Blakely Sokoloff Taylor & Zafman LLP

(57) ABSTRACT

A method and an apparatus for evaluating an expression embedded inside a communication packet received from an RFID (Radio Frequency Identification) interrogator device are described. The evaluation result may determine a selection with another RFID interrogator device. An RFID data packet may be sent to an RFID interrogator device based on a selection to be associated with the RFID interrogator. A task may be performed based on the evaluation as instructed by a remote RFID interrogator through a command included in the wireless communication packet.

20 Claims, 14 Drawing Sheets

METHOD AND APPARATUS FOR ACTIVE RFID NETWORK

FIELD OF INVENTION

The present invention relates generally to wireless systems. More particularly, this invention relates to an active RFID (Radio Frequency Identification) system.

BACKGROUND

Wireless networks, such as WPAN (Wireless Personal Area Network) systems based on IEEE802.15.4, have been deployed in recent years. Many sensor networks are developed based on WPAN technologies. Active RFID systems have also been widely used in tracking assets for the last ten years. It is appreciated that many real-life applications require a single wireless system to deliver both sensor network and RFID functionalities.

A main problem of existing wireless network systems is that it does not support a selection operation needed in typical RFID applications. Often times, an interrogator in an RFID application needs to select a portion of RFID tags to participate in specific data transactions with the interrogator. Although an interrogator can be configured with pre-selected set of RFID tags, such an approach may be too rigid for certain application. For example, the capability of a portable interrogator is severely limited without the support of selection operations.

Therefore, current wireless systems, although may be used in a sensor network application, do not provide a robust infrastructure to support RFID functionalities.

SUMMARY OF THE DESCRIPTION

An embodiment of the present invention includes a method and apparatus that evaluate an expression embedded inside a wireless communication packet received from an RFID (Radio Frequency Identification) interrogator device. The evaluation result may determine a selection with another RFID interrogator device. An RFID communication packet may be sent to a second RFID interrogator device to indirectly select a group of tags that are associated with the second RFID interrogator. A task may be performed based on the evaluation as instructed by an RFID interrogator through a command included in the wireless communication packet.

In an alternative embodiment, the method and apparatus may send a data packet including selection criteria to another wireless device to store an identification received from another wireless device. A selection relationship with the second wireless device may be established based on the selection criteria. RFID data may be collected from the wireless device having a selection relationship.

Other features of the present invention will be apparent from the accompanying drawings and from the detailed description that follows.

BRIEF DESCRIPTION OF THE DRAWINGS

The present invention is illustrated by way of examples and not limitation in the figures of the accompanying drawings, in which like references indicate similar elements and in which.

DETAILED DESCRIPTION

Figure 1:
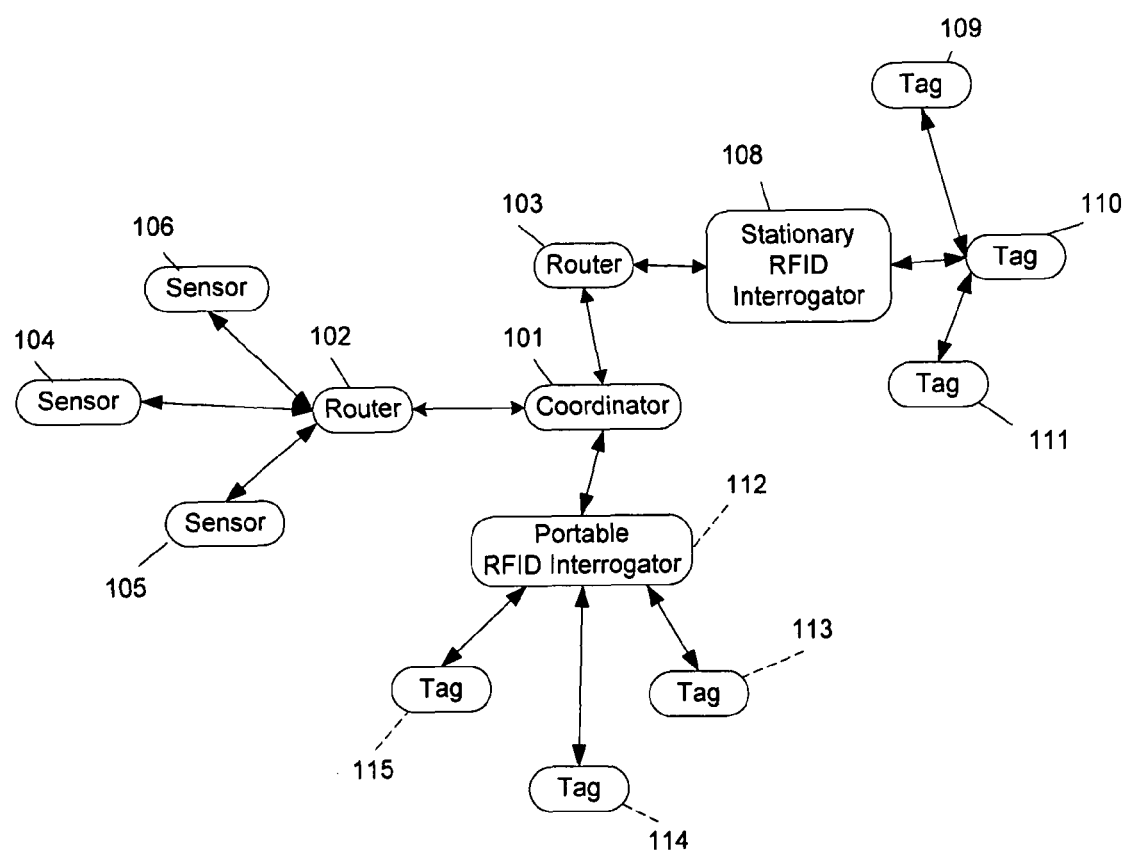
FIG. 1 is a network diagram illustrating one embodiment of wireless network components including RFID (Radio Frequency Identification) and sensor devices.

A method and an apparatus for an active RFID network are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "host", "device", "interrogator" and "tag" are intended to refer generally to data processing systems rather than specifically to particular form factors.

In one embodiment, an active RFID system may be designed to enable a single wireless system with both sensor-network and RFID functionalities. In this system, a broadcast packet or data packet based on a WPAN (Wireless Personal Area Network) may be employed to carry out a selection function of wireless devices. A communication packet may be a data packet or a broadcast packet. In one embodiment, a device may be a wireless device with sensor, RFID or both capabilities. A polling period associated with a selected device may be changed on the fly. In one embodiment, a selected device may be associated with a polling period different from the polling period of an unselected device.

According to one embodiment, a portable interrogator may be allowed to communicate directly with a selected group of wireless devices. The portable interrogator may be an RFID interrogator capable of collecting data from RFID devices wirelessly. A device may be associated with a stationary interrogator before being selected by a portable interrogator. In one embodiment, a portable interrogator may select a device that is associated with a stationary interrogator by sending the stationary interrogator a communication packet with selection criteria. A selected device by a portable interrogator may be associated with the portable interrogator. The association between a device and a portable interrogator may be temporarily until one or more data transaction are completed.

FIG. 1 is a network diagram illustrating one embodiment of wireless network components including RFID and sensor devices. In one embodiment, network system 100 includes wireless devices such as coordinators, routers, sensor nodes, and RFID tags. A router may be a WPAN router. For example, router 102 may store network identifications for the associated sensor nodes 104, 105 and 106. A sensor node may be equipped with specific sensing capabilities to transmit sensed data values in a wireless manner. A sensed data from a sensor node may be related to temperature, light, or location, etc. A coordinator 101 may be associated with a well known wireless network address. A coordinator may be the root of a network configuration of a wireless network to allow a wireless packet from one device to reach any other device of the same wireless network.

An interrogator may be an RFID device capable of reading and writing data from and to one or more RFID tags. The interrogator establishes an association with one or more RFID tags, such as the association among wireless device 108 and RFID tags 109, 110, and 111. Network identifications of one wireless device may be known to another associated wireless device. An RFID tag may send out a wireless packet including a network identification of an associated interrogator. An interrogator may belong to a large WPAN. Alternatively, an interrogator may be an independent coordinator for a plurality of RFID tags. In one embodiment, a stationary interrogator may be located at a fixed location relative to its associated RFID tags. A portable interrogator, such as wireless device 112, may be located at different positions relative to its associated RFID tags, such as RFID tags 113, 114 and 115, at different times. At a particular point of time, a portable RFID interrogator may not be associated with any RFID tags.

Figure 2:
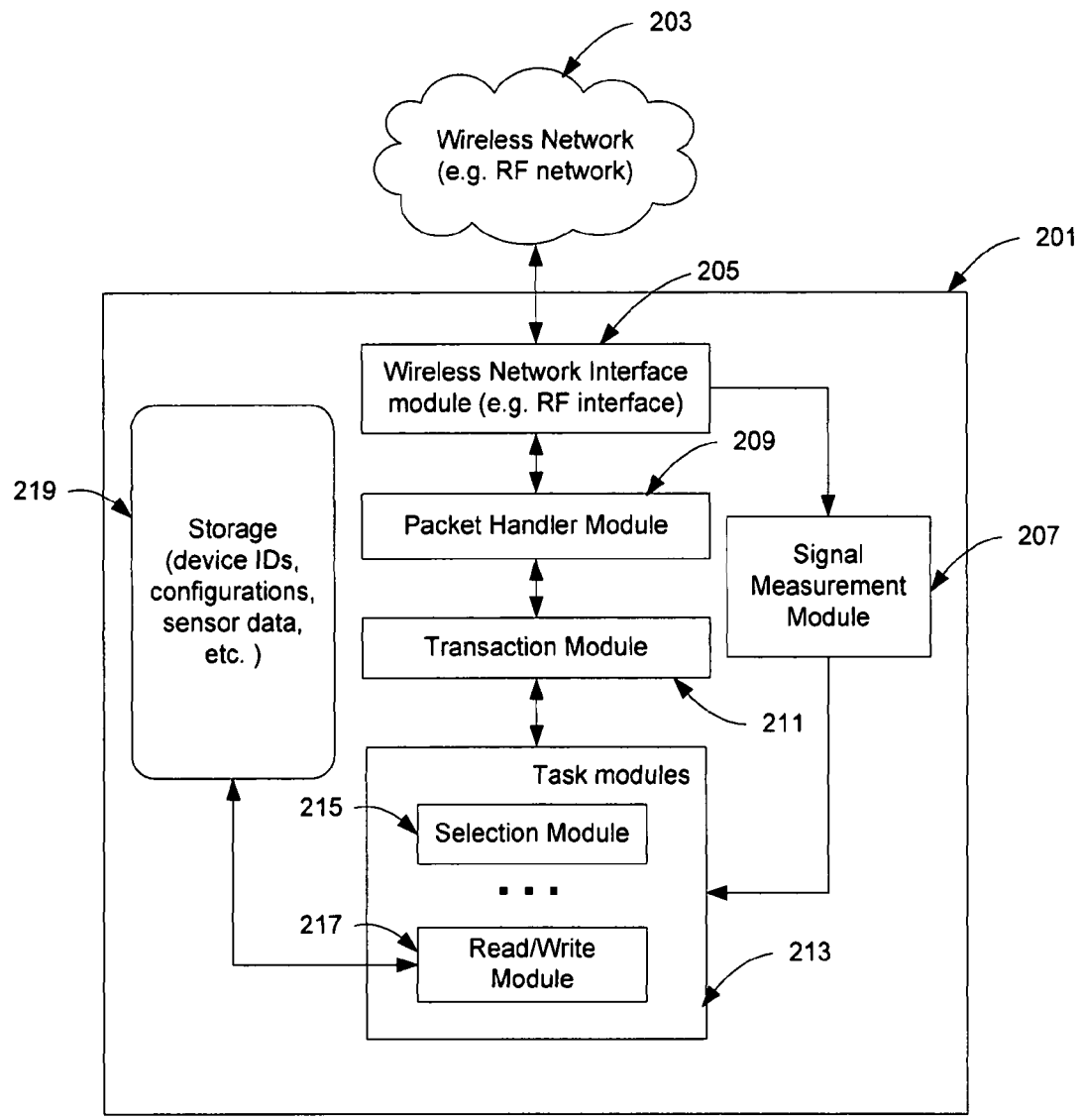
FIG. 2 is a block diagram illustrating one embodiment of system components for a wireless device in an active RFID network.

FIG. 2 is a block diagram illustrating one embodiment of system components for a wireless device in an active RFID network. System 201 may be associated with a wireless device such as an RFID interrogator in a wireless network 203. In one embodiment, the wireless network 203 may be an RF (Radio Frequency) network. System 201 may interface with the wireless network 203 through a wireless network interface module 205. In one embodiment, the interface module 205 may include RF components. A signal measurement module 207 may produce a measurement based on an input from the interface module 205 according to a wireless signal received from the wireless network 203. In one embodiment, the measurement may be an indicator related to a wireless signal from the wireless network 203. In another embodiment, the indicator may be an RSSI (Receive Signal Strength Indicator). A packet handler module 209 may be coupled with the wireless network interface 205 for packing or unpacking wireless data according to a predetermined protocol, such as IEEE 802.15.4. The packet handler module 209 may identify and/or compose a wireless packet as a broadcast packet or a dedicated packet for a wireless network. A broadcast packet may be a beacon packet. In one embodiment, the packet handler module 209 may determine whether there is a match between a wireless packet received and a network ID (identification) associated with the system 201. The packet handler module 209 may discard a dedicated packet received without a matching network ID.

A transaction module 211, according to one embodiment, may activate one or more task modules according to received wireless packets. For example, a packet received from a wireless device may include a command requesting a particular data collected by system 201. The transaction module 211 may identify selection criteria from a data packet to activate a selection module 215. In one embodiment, the transaction module 211 periodically sends out a polling request to a selected wireless device, such as an RFID interrogator having a selection relationship with system 201.

Task modules 213 may include a plurality of modules to perform tasks for the transaction module 211. For example, a read/write module 217 may retrieve data stored in a storage module 219 to send back to a requesting wireless device according to a command in a received packet. In another embodiment, the read/write module 217 may update a value stored in the storage module 219. In one embodiment, a selection module 215 performs an evaluation of the selection criteria received to determine whether to establish a selection relationship with another wireless device. The storage 219 may store values including network IDs, configurations, and raw data for system 201. A selected interrogator may be identified by comparing the network ID received in a wireless packet with a network ID stored in the storage. In one embodiment, configuration values may include timing periods for system 201 to stay inactive to save power usage. In another embodiment, raw data may be sensor data collected by a sensor associated with system 201.

Figure 3:
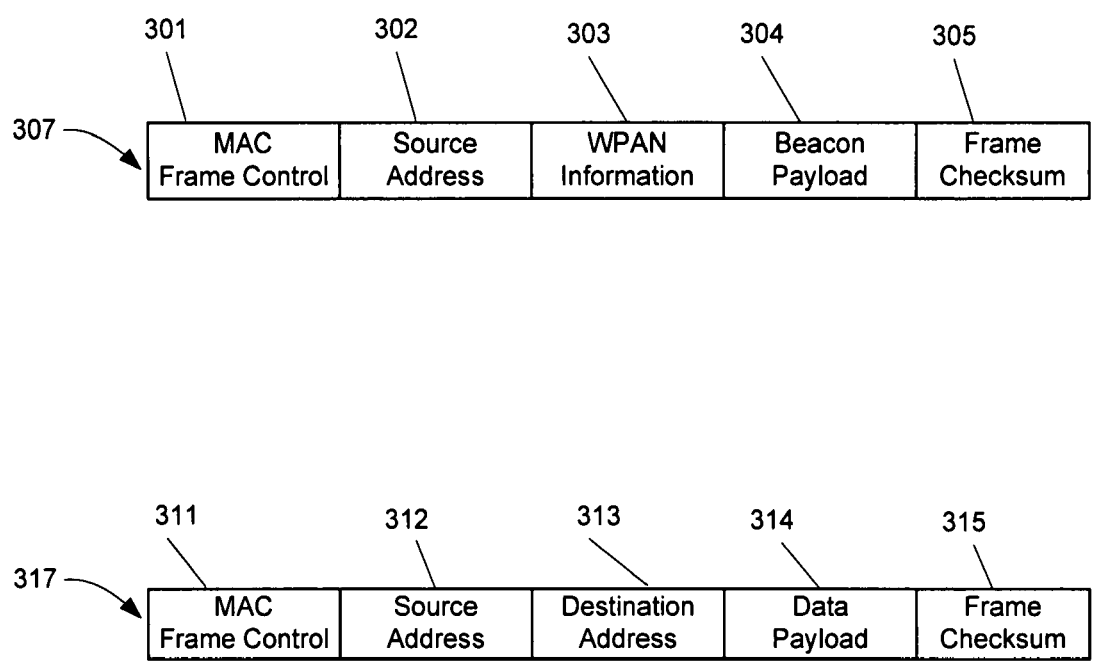
FIG. 3 illustrates embodiments of a typical MAC (Medium Access Control) layer beacon packet and a data packet.

FIG. 3 illustrates embodiments of a typical MAC (medium Access Control) layer beacon packet and a data packet. A beacon packet 307 may comprise a MAC frame control field 301, a source address field 302, a WPAN information field 303, a beacon payload field 304, and a frame checksum field 305. It should be noted that it does not have a destination address field because it is a broadcast packet. A data packet 317 may consist of a MAC frame control field 311, a source address field 312, a destination address field 313, a data payload field 314, and a frame checksum field 315. A specific destination address, such as FF..FF may commonly be used to indicate a broadcasted data packet.

Figure 4A:
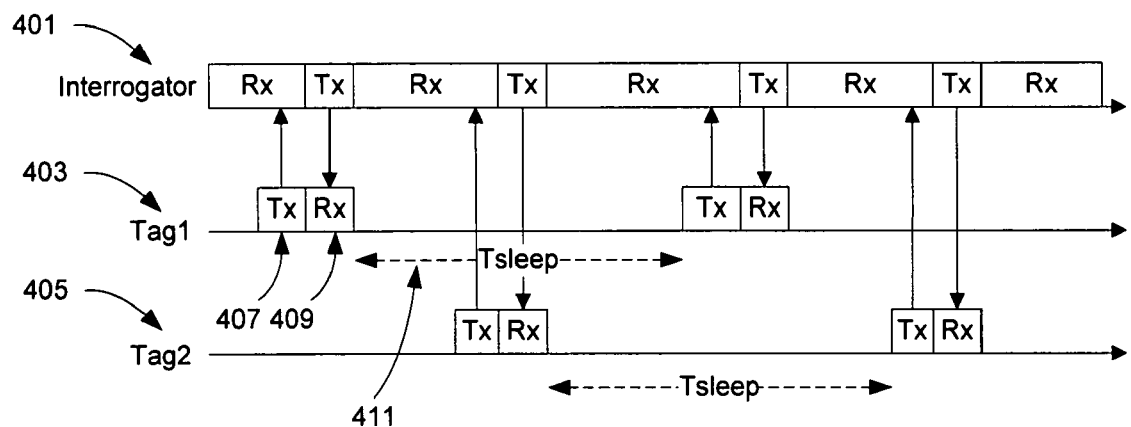
FIG. 4A illustrates exemplary operations of an embodiment of a battery operated RFID device in an active RFID network system.

FIG. 4A illustrates exemplary operations of an embodiment of a battery operated RFID device in an active RFID network system. Typically, an RFID tag operated with a battery enters a sleep mode periodically to preserve the battery usage. In one embodiment, the battery-operated RFID tags Tag1 403 or Tag2 405 repetitively poll an interrogator 401. An RFID tag may send a poll packet to inform the receiving wireless device, such an interrogator, a status of the sending tag. In one embodiment, Tag1 403 sends out short packets to the interrogator 401 at time instance 407. Subsequently, Tag1 403 may receive a response from the interrogator 401 at time instance 409. If the response, such as a simple ACK (acknowledgement) response, does not include any data packet, Tag1 403 may enter a sleep mode. Alternatively, if Tag1 403 does not receive any packet after sending out the poll packet for a predetermined period of time, Tag1 403 may also enter a sleep mode. Usually, a timer inside an RFID tag may count the time spent during a sleep mode and wake up the RFID tag after a predetermined period of time such as Tsleep 411. In the event that Tag1 403 receives a data packet from the interrogator 401, it may complete the data transaction with interrogator 401 and enter the sleep mode. It should be noted that the response time of a battery-operated tag may be dominated by a period of time in a sleep mode, such as Tsleep/411, typically in the range of tens of seconds.

Figure 4B:
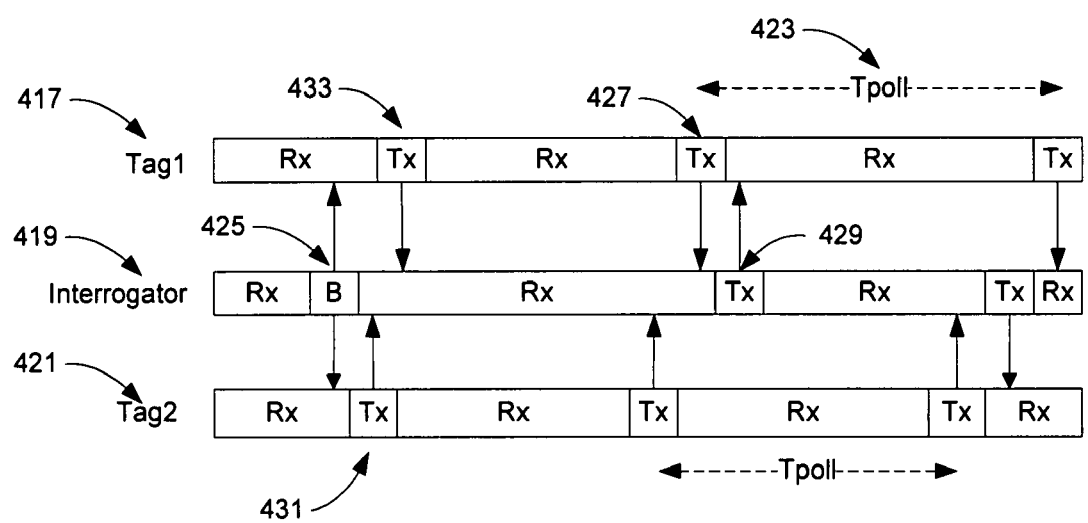
FIG. 4B illustrates exemplary operations of an embodiment of an active RFID device with continuous power source in an active RFID network.

FIG. 4B illustrates exemplary operations of an embodiment of an active RFID device with continuous power source in an active RFID network. Active RFID tags Tag1 417 and Tag2 421 may have continuous power sources. In one embodiment, an interrogator 419 broadcasts out a beacon or data packet at time instance 425. In response, Tag2 421 may respond to the beacon or data packet at time instance 431 while Tag1 417 may respond to the same beacon or data packet at another time instance 433. Tag1 417 may respond with a polling packet to interrogator 419. In one embodiment, Tag1 417 or Tag2 421 repetitively poll the interrogator 419 for approximately every Tpoll 423 period. An active RFID tag may send out a poll packet to an interrogator for initiating a transaction with the interrogator. For example, Tag1 417 may send out a short packet to the interrogator 419 at time instance 427 for a transaction at time instance 429. Tag1 417 may receive a data packet for the transaction at time instance 429. In one embodiment, Tag1 417 enters a receive mode after completing the transaction 429. An active RFID tag may stay in a receive mode. In one embodiment, an active RFID may leave the receive mode for a duration that it sends out one or more communication packets. It should be noted that the response time of an active RFID tag with constant power source is very fast, such as in the range of milliseconds, because the tag is always listening to the interrogator.

Figure 5:
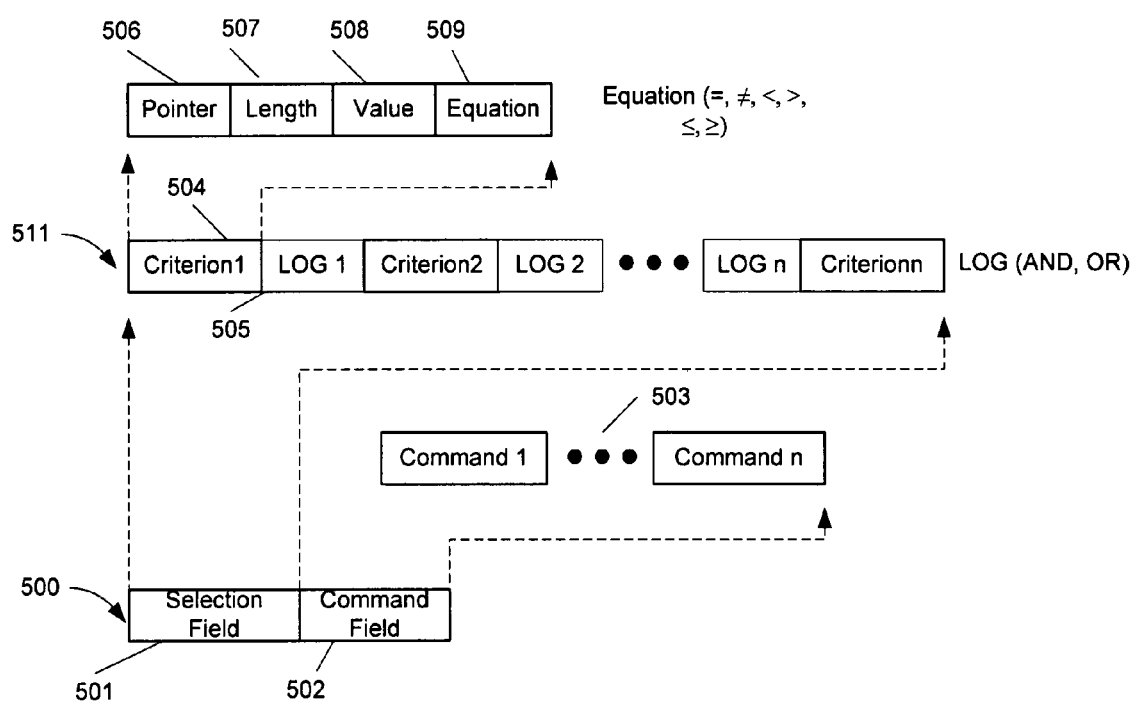
FIG. 5 illustrates an exemplary selection frame of a communication packet in an embodiment of an active RFID network.

FIG. 5 illustrates an exemplary selection frame of a communication packet in an embodiment of an active RFID network. The selection frame 500 may be part of a selection payload in a broadcast packet or a dedicated packet. In one embodiment, a selection frame 500 comprises a selection field 501 and a command field 502. The selection filed 501 may include selection criteria to determine whether a receiving RFID tag meets certain conditions. In one embodiment, if an RFID tag is determined to satisfy the selection criteria described in the selection field 501, the RFID tag may execute the operations instructed by an interrogator according to the command field 502.

The command field 502 may contain at least one or multiple commands 503 from an interrogator. In one embodiment, a command field includes a READ command to instruct an RFID tag to send back content retrieved from a storage inside the RFID tag. A READ command may be associated with a payload field including a pointer pointing to a storage location and a length indicating a data length in bit or byte. A command may instruct a receiving RFID tag to stop waiting for responses from additional interrogators if the RSSI associated with a received wireless packet is greater than a threshold value (e.g. −60 dBm) specified in the command payload.

The selection field 501 may include executable expressions. In one embodiment, the expressions are associated with at least one or multiple criteria 504 that may be concatenated by logical operations. A logic operation 505 may be, for example, an AND operation, an OR operation, or a NOT operation. In one embodiment, a criterion, such as Criterion1 504, is defined by a Pointer field 506, a Length field 507, a Value field 508, and an Equation field 509. Field Pointer 506 and field Length 507 may describe a range of memory storages inside a receiving RFID tag. Field Value 508 may include a bit stream having a length as described in field Length 507. A receiving RFID tag may perform a comparison according to field Value 508 and the memory content specified by field Pointer 506 and field Length 507. The comparison may be based on field Equation 509 which may include comparison relationships such as $=, \neq, >, <, \geq,$ and $\leq$. In one embodiment, a Boolean value (True or False) is associated with a criterion based on a comparison. For example, Criterion1 504 may be associated with True or False depending on whether the relationship between field Value 508 versus the memory storages specified by field Pointer 506 and field Length 507 is consistent with field Equation 509. In one embodiment, field Length 507 with a specific value, such as 0, indicates the corresponding criterion has been satisfied by the receiving RFID tag without performing comparison operations based on field Equation 509. In one embodiment, whether the selection criteria specified in the selection field 501 are met is determined by logic operations, such as LOG1 505, among comparison results of criteria, such as Criterion1 504.

Figure 6:
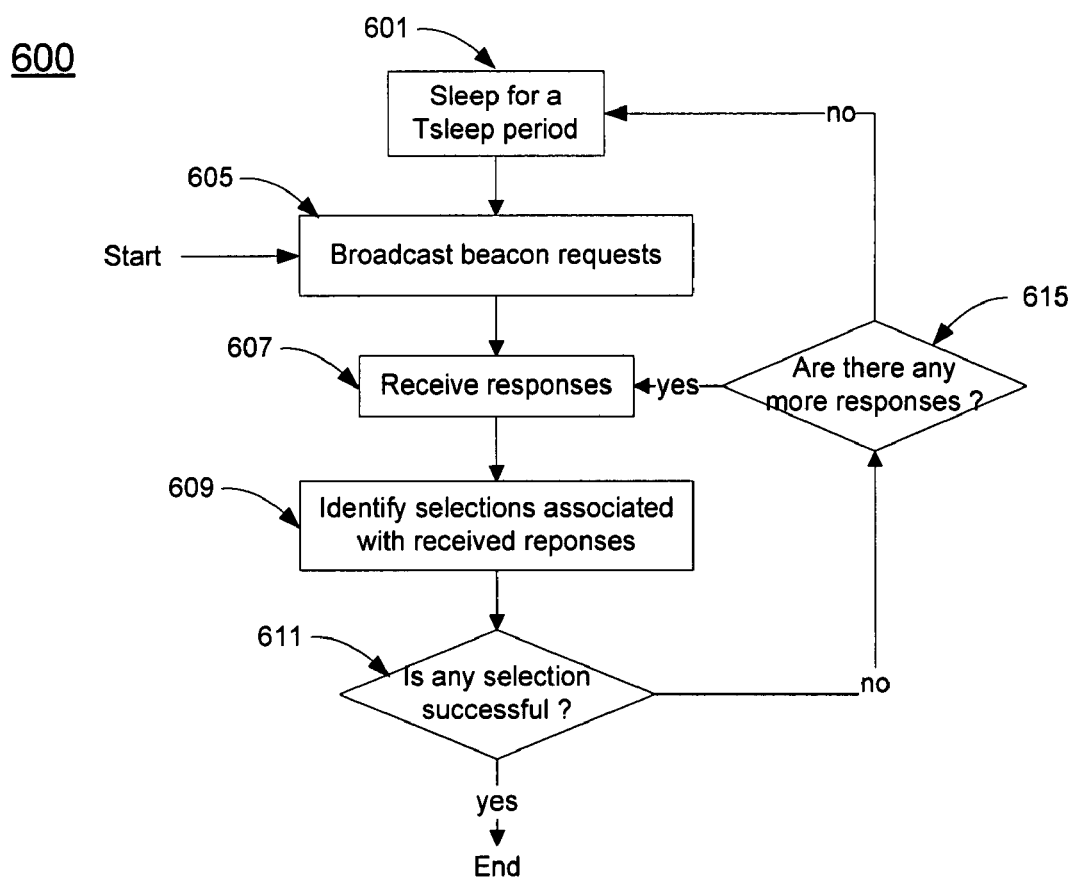
FIG. 6 is a process diagram illustrating one embodiment of a selecting process for a wireless device in an active RFID network.

FIG. 6 is a process diagram illustrating one embodiment of a selecting process for a wireless device in an active RFID network. In one embodiment, process 600 may be performed according to system 201 of FIG. 2. Process 600 may enable an RFID tag to establish a selection relationship in association with an interrogator coupled to the RFID tag through a wireless network. Process 600 may broadcast a beacon request or send a poll packet in an RFID wireless network at block 601. The beacon request packet may identify an RFID tag, which is not associated with any interrogator in the RFID network. The data packet may identify an RFID tag that is already associated with an interrogator. At block 605, process 600 checks whether there is any response packet received in response to the packets sent at block 601. If there is no packet received from any interrogator, process 600 may sleep for a Tsleep period at block 603. A packet may include a selection payload having a selection frame. If one or more packets are received at block 605, process 600 may further examine whether there is any selection payload at block 607. If there is no selection payload identified, process 600 may perform the tasks according to the response packet sent by the interrogator at block 615. In one embodiment, process 600 identifies a selection frame, such as selection frame 500 of FIG. 5, from a received communication packet.

At block 611, in one embodiment, process 600 determines whether there is a successful selection based on selection criteria from a response data packet. In one embodiment, if the selection criteria from the response data packet are met, for example, based on a comparison operation according to Equation 509 of FIG. 5, process 600 may execute one or more tasks as directed in the command field of the selection frame, such as the selection frame 500 of FIG. 5, from received communication packet at block 613. Process 600 may rely on additional data associated with the wireless signal corresponding to the received data packet to determine whether the received communication packet is associated with a successful selection. For example, if the corresponding RSSI value of a received communication packet, such as the indicator value from the signal measurement module 207 in FIG. 2, exceeds a predetermined threshold (e.g. −60 dBm), process 600 may determine a successful selection has been found if the associated selection criteria for the data packet are found to be satisfactory. In another embodiment, process 600 may not determine a successful selection until all responses have been received. Process 600 may choose a successful selection based on a response with the strongest RSSI value among all responses for which selection criteria are met. In one embodiment, process 600 concludes all responses have been received based on a predetermined waiting period. In one embodiment, a waiting period may be based on a command field of the selection frame, such as the selection frame 500 of FIG. 5.

Figure 7:
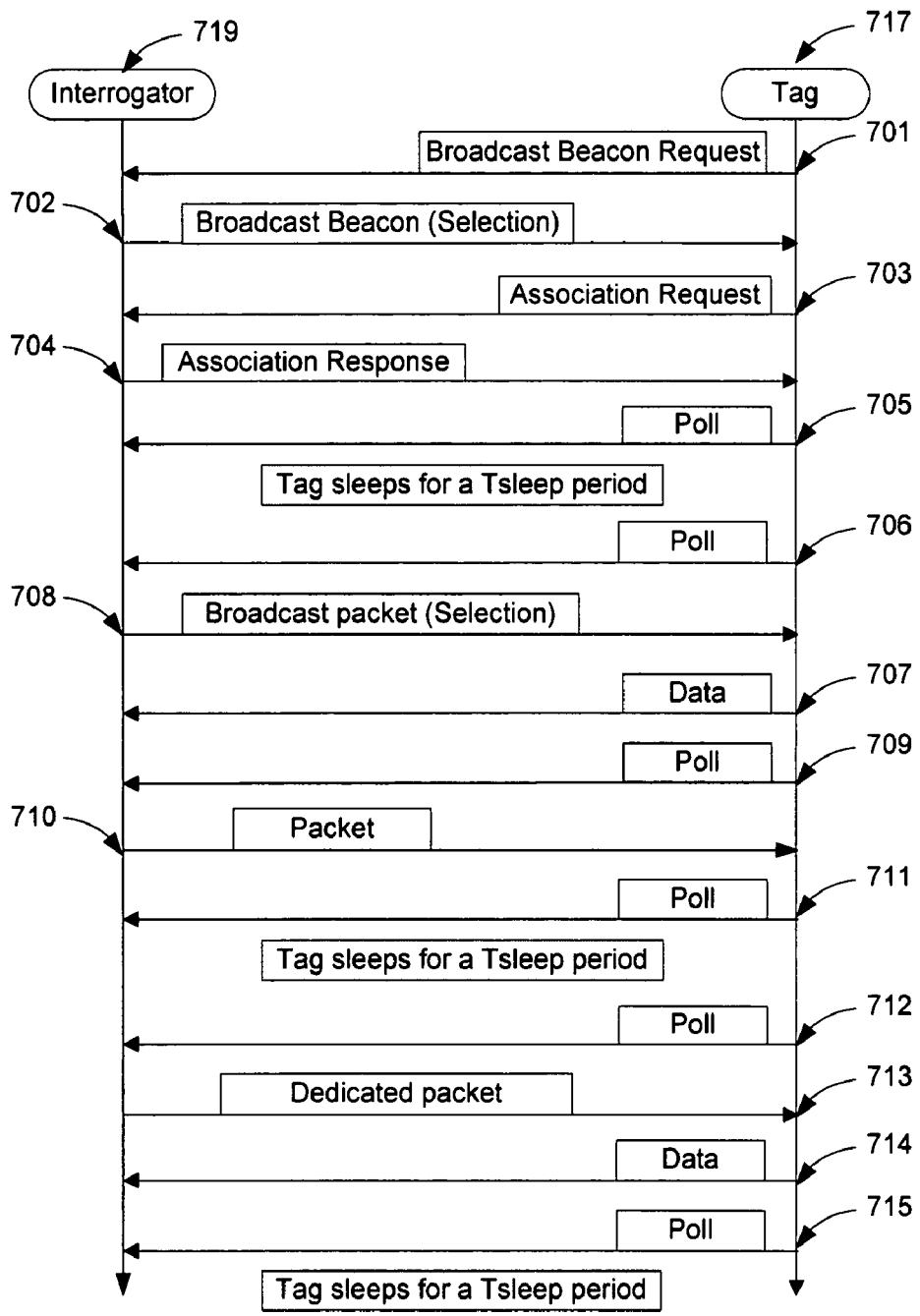
FIG. 7 is a sequence diagram illustrating one embodiment of a wireless device establishing an association relationship with an interrogator in an active RFID network.

FIG. 7 is a sequence diagram illustrating one embodiment of a wireless device establishing an association relationship with an interrogator in an RFID network. In one embodiment, Tag 717 broadcasts a beacon request packet at time instance 701. The beacon request may indicate Tag 717 is not currently associated with any interrogator in the wireless network. Tag 717 may broadcasts multiple beacon request packets. In response, Interrogator 719 may broadcast a beacon packet including a selection payload, such as selection frame 500 in FIG. 5. In one embodiment, more than one interrogators in the wireless network broadcast beacon packets with selection payloads in response to a beacon request packet. Tag 717 may perform a selection process, such as process 600, in response to received selection payloads.

If a selection associated with Interrogator 719 is successful, Tag 717 may send an association request packet to Interrogator 719 at time instance 703. In response, Interrogator 719 may send an association response packet to Tag 717 at time instance 704. In one embodiment, Interrogator 719 determines whether it has extra capacity to associate with additional wireless devices before sending an association response packet. After Tag 717 establishes an association with Interrogator 719, it may poll Interrogator 719 at time instance 705. In one embodiment, Tag 717 repetitively sends out polling packets to Interrogator 719. If Interrogator 719 does not respond to polling packets from Tag 717, Tag 717 may sleeps for a predetermined period of time (Tsleep) to send another polling packet to Interrogator 719 after waking up at time instance 706.

In the event that Interrogator 719 intents to communicate with a selected group of tags including Tag 717, it may send a broadcast beacon packet or a dedicated data packet to Tag 717 at time instance 708. The packet may include selection criteria via a selection frame, such as the selection frame 500 of FIG. 5. If Tag 717 meets the selection criteria according to a selection process such as process 600 of FIG. 6, Tag 717 may respond with a data packet at time instance 707. The data packet may include data based on a command in the received packet from Interrogator 719, such as command field 502 of FIG. 5. In one embodiment, Tag 717 sends a polling packet to Interrogator 719 for more data at time instance 709. In response, Interrogator 719 may send another packet at time instance 710. The packet may be an RFID packet or another selection packet. Tag 717 may perform configuration updates according to the received selection payload. In one embodiment, Tag 717 sends another polling packet at time instance 711. Subsequently, Tag 717 may go to sleep for a Tsleep period if Tag 717 does not receive any further packet from Interrogator 719 within a predetermined period of time. At time instance 712, Tag 717 may wake up to send a polling packet. In response, Interrogator 719 may send a dedicated data packet at time instance 713 to perform a data transaction with Tag 717. Tag 717 may respond with a data packet at time instance 714 and send an additional polling packet at time instance 715.

Figure 8:
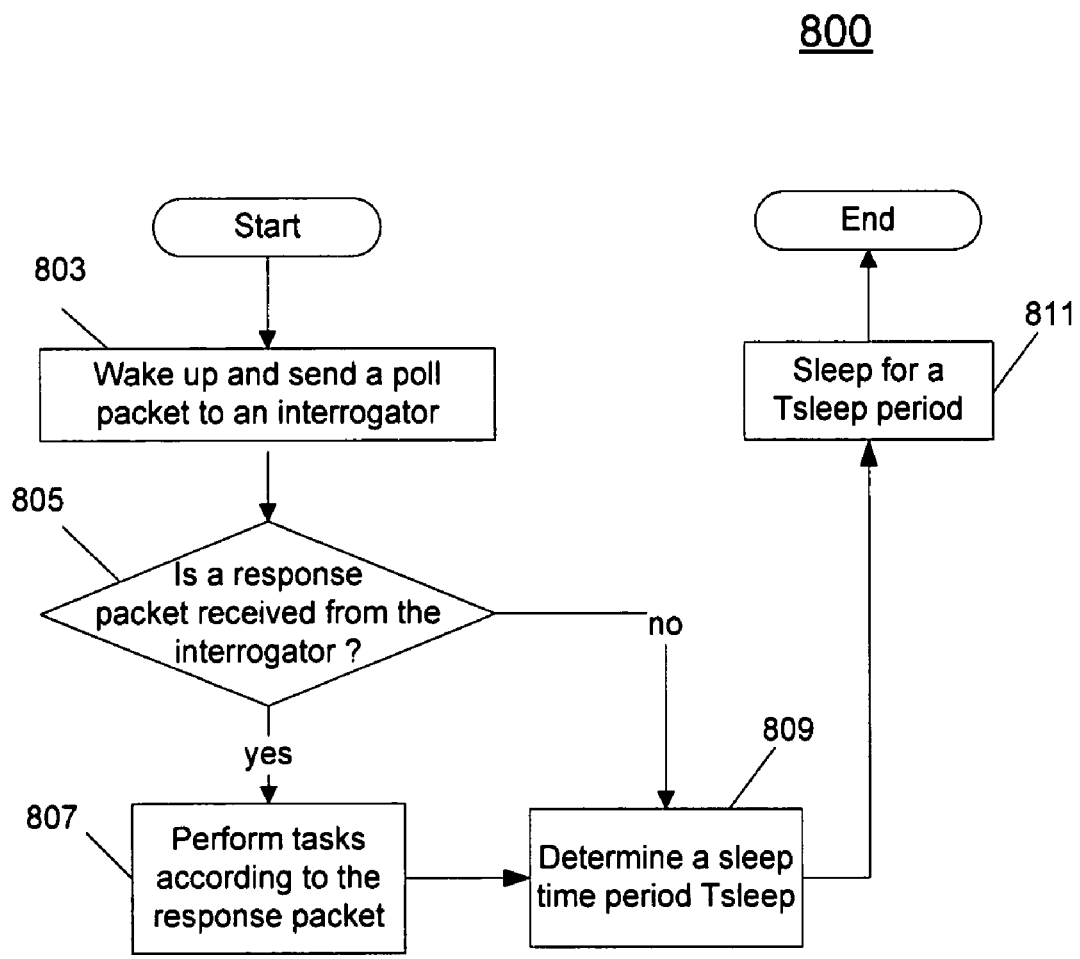
FIG. 8 is a flow diagram illustrating one embodiment of a process for a wireless device to perform tasks in an active RFID network.

FIG. 8 is a flow diagram illustrating one embodiment of a process for a wireless device to perform tasks in an active RFID network. In one embodiment, the tasks may include changing a Tsleep time in the wireless device. Process 800 may wake up and send a polling or beacon request-packet to an interrogator of the wireless network. At block 805, process 800 may determine whether a response packet has been received. In one embodiment, process 800 listens to response packets for a predetermined period of time before making a determination at block 805. If no packet is received, process 800 may continue at block 809 to set up a sleep time period to prepare for entering a sleep mode. In one embodiment, the sleep time period may be read from a storage area in a wireless device. In the event that a response packet has been received at block 805, process 800 performs tasks according to the received packet at block 807. The received packet may include selection payload, such as selection frame 500 of FIG. 5. Process 800 may perform tasks according to process 600 of FIG. 6. The received packet may be a RFID data packet that has a command field to instruct the wireless device to perform one or more tasks. In one embodiment, a task updates configuration settings inside a wireless device. A configuration setting may be the value of a sleep time period. In one embodiment, the sleep time period in the wireless device is shortened according to tasks performed at block 807 as requested by an interrogator. At block 809, process 600 may determine a sleep time period based on whether a response packet has been received after sending the last poll packet. Process 800 may determine to use a default sleep time period if no response packet is received since sending the last poll packet. In another embodiment, process 800 may set the sleep time period according to a configuration update based on a response packet. Process 800 may go to sleep at block 811 for a sleep time period set at block 809.

Figure 9:
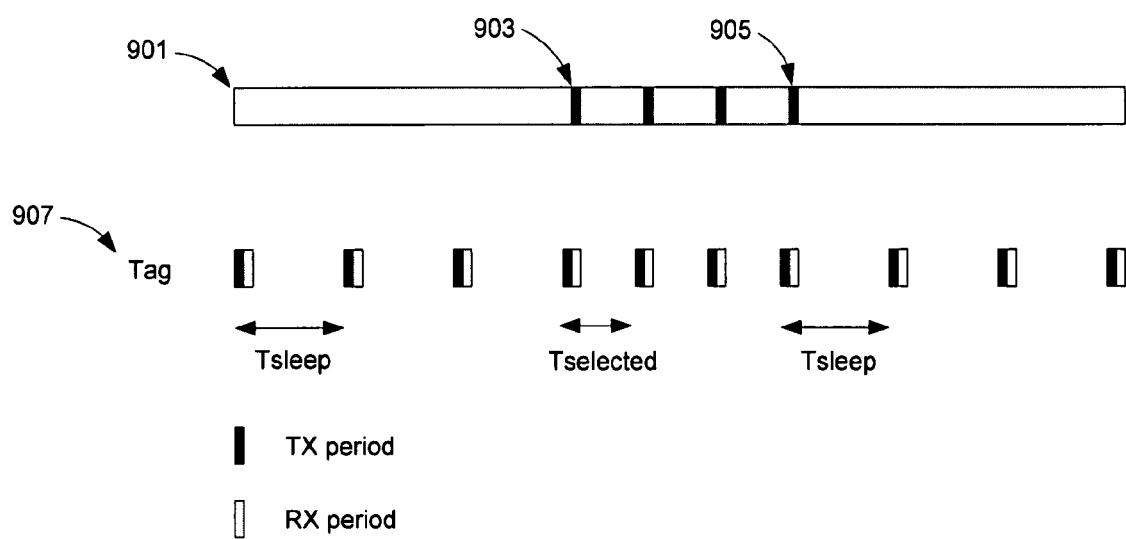
FIG. 9 is a sequence diagram illustrating an embodiment to change polling periods for a wireless device in an active RFID network.

FIG. 9 is a sequence diagram illustrating an embodiment to change polling periods for a wireless device such as a RFID tag in an active RFID network. In one embodiment, a polling period of a tag may be changed according to whether the tag is selected or not selected. A tag may be selected when selection criteria in a wireless packet received from an interrogator 909 are met. At time instance 901, for example, Tag 907 may send a polling packet to an interrogator 909 during a transmission period (TX period). The target interrogator 909 may be associated with Tag 907. Afterwards, Tag 907 may stay in a receiving mode for a period of time (RX period). In one embodiment, Tag 907 sends polling packets to the interrogator for every Tsleep period repetitively. In the event that Tag 907 receives a broadcast packet from the interrogator and finds itself meeting the selection criteria included in the broadcast packet, Tag 907 may change its polling period to Tselected at time instance 903. Tselected may be a shorter time period than Tsleep. At time instance 905, Tag 907 may complete a data transaction with the interrogator. Tag 907 may determine that a data transaction is complete based on not receiving any response from the interrogator 909 after sending a polling packet for a predetermined period time. In another embodiment, Tag 907 is informed of completion of data transaction based on a packet received from the interrogator 909. Tag 907 may change its polling period back to Tsleep after completing a data transaction. In one embodiment, Tsleep is a default polling period for Tag 907.

Figure 10:
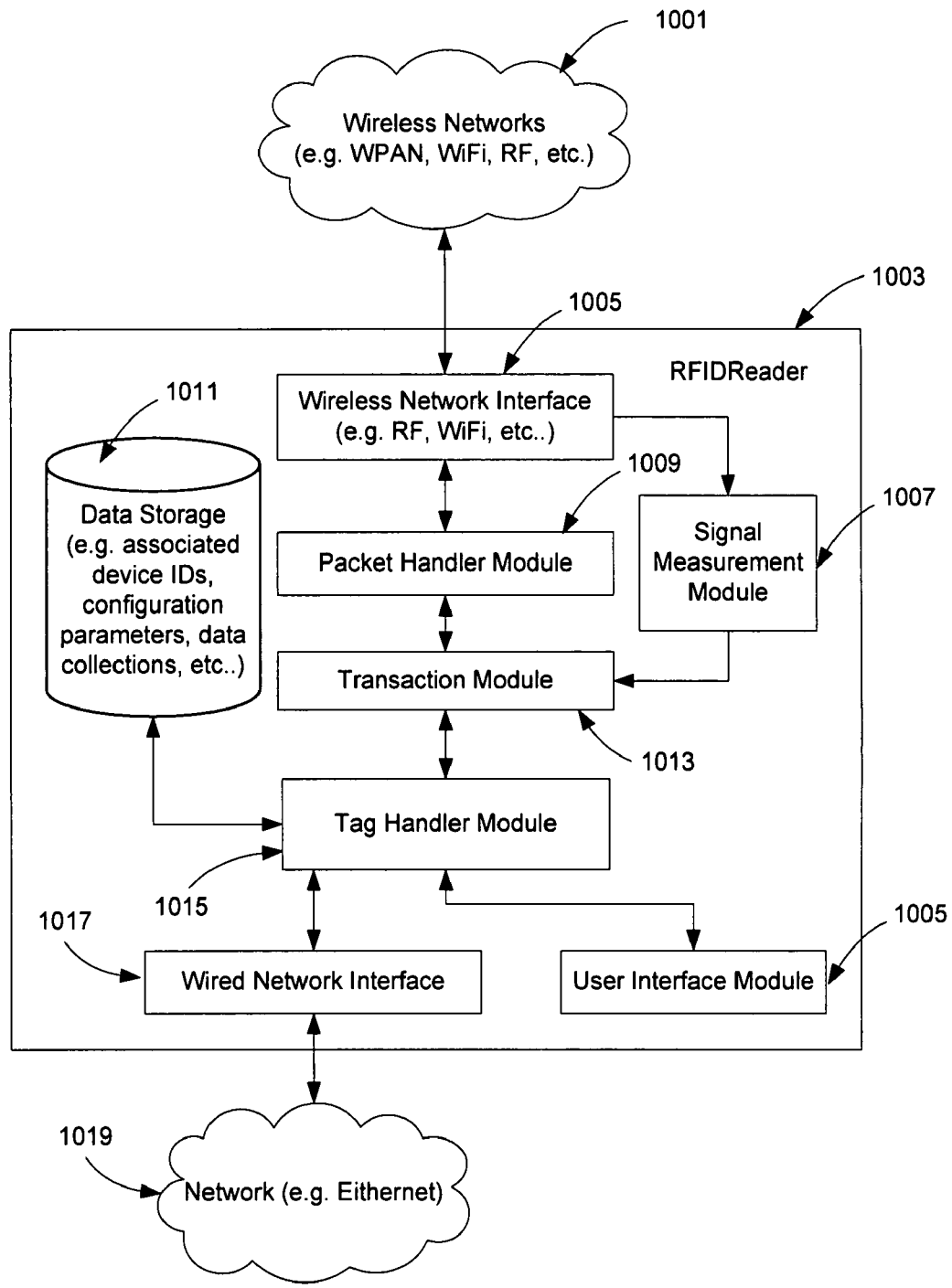
FIG. 10 is a block diagram illustrating one embodiment of an interrogator in an active RFID network.

FIG. 10 is a block diagram illustrating one embodiment of an interrogator in an active RFID network. In one embodiment, system 1003 communicates with wireless networks 1001 through a wireless network interface 1005. The wireless network 1001 may include a WPAN network, a WiFi (Wireless Fidelity) network or an RF network. System 1003 may interface with a wired network 1019 such as Ethernet through a wired network interface 1017. In one embodiment, system 1003 includes a packet handler module 1009 to process packet protocols for wireless packets over wireless networks 1001.

Transaction module 1013 may conduct data transaction with another wireless device, such as an RFID tag within the same wireless network. In one embodiment, transaction module 1013 responds to a beacon request from an RFID tag not associated with any interrogator. In another embodiment, transaction module 1013 determines to send a dedicated data packet including a task command in response to a polling packet received from a tag. When the number of tags associated with system 1003 exceeds a predetermined threshold, according to one embodiment, transaction module 1013 may ignore beacon requests for establishing an association relationship. A selection criterion, such as in Selection Field 501 of FIG. 5, may be used to establish an association relationship. In one embodiment, transaction module 1013 performs data transaction with a tag to end a current association relationship with system 1003 and establish a new association relationship between the tag and a portable interrogator. Additionally, transaction module 1013 may determine to ignore a beacon request based on input from a signal measurement module 1007. In one embodiment, signal measurement module 1007 derives a measurement of wireless signal associated with a received wireless packet. The measurement may indicate the strength of the wireless signal, such as RSSI for the wireless signal.

In one embodiment, tag handler module 1015 manages wireless devices, such as RFID tags, associated with system 1003. Data storage 1011 may be coupled with tag handler module 1015 to store associated IDs and configuration parameters for a wireless device. Tag handler module 1015 may determine selection criteria for transaction module 1013 to send to a wireless device. In one embodiment, tag handler module 1015 stores data collected from an RFID tag into storage 1011. Tag handler module 1015 may instruct transaction module 1013 to send a dedicated data packet to an associated RFID tag. In one embodiment, a user interface module 1005 coupled with tag handler module 1015 allows a user to access RFID tags and collect data associated with system 1003 in real time.

Figure 11:
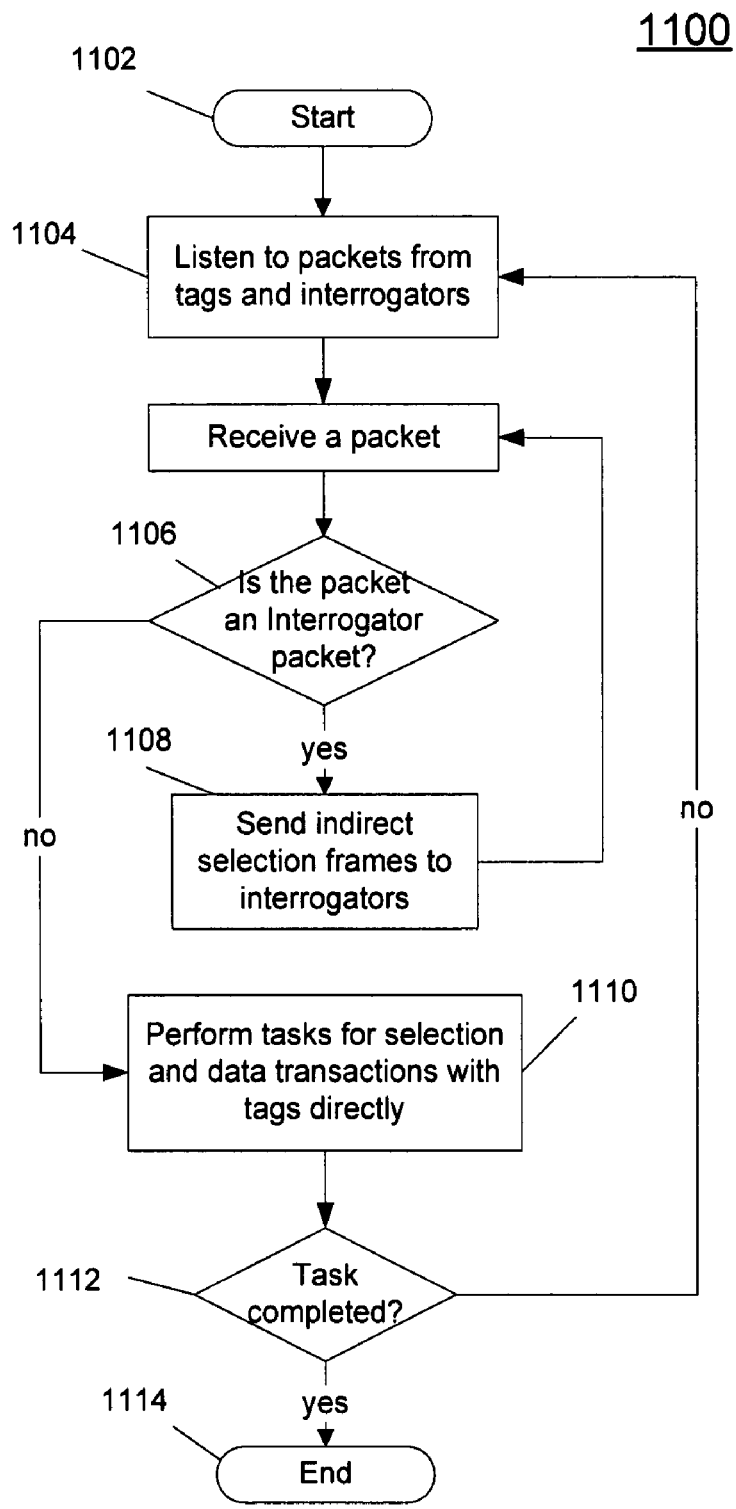
FIG. 11 is a flow diagram illustrating one embodiment of a process for a portable interrogator to select a wireless device already associated with a stationary interrogator in an active RFID network.

FIG. 11 is a flow diagram illustrating one embodiment of a process for a portable interrogator to select a wireless device already associated with a stationary interrogator in an active RFID network. A portable interrogator may not be associated with any wireless device when joining a wireless network. In one embodiment, process 1100 may be performed in a portable interrogator based on a system such as system 1003 of FIG. 10. After joining a wireless network, process 1100 may listen to wireless packets from wireless devices such as stationary interrogators and tags at block 1104. After receiving a packet, process 1100 may determine whether the received packet is from an interrogator at block 1106. In one embodiment, the received packet is addressed to process 1100. Process 1100 makes a determination about the source of the received packet based on a network ID included in the packet. If process 1100 detects a source stationary interrogator from the packet, process 1100 may send one or multiple indirect selection frames to the stationary interrogator at block 1108. Otherwise, process 1100 may perform selection and data transactions with the source tag associated with the received packet directly at block 1110. Process 1100 may check whether the task is completed at block 1112. If the task is not completed, process 1100 may continue to block 1104. Otherwise, process 1100 may end at block 1114. In one embodiment, process 1100 determines the task is complete if a predetermined period of time has passed since starting at block 1102.

Figure 12:
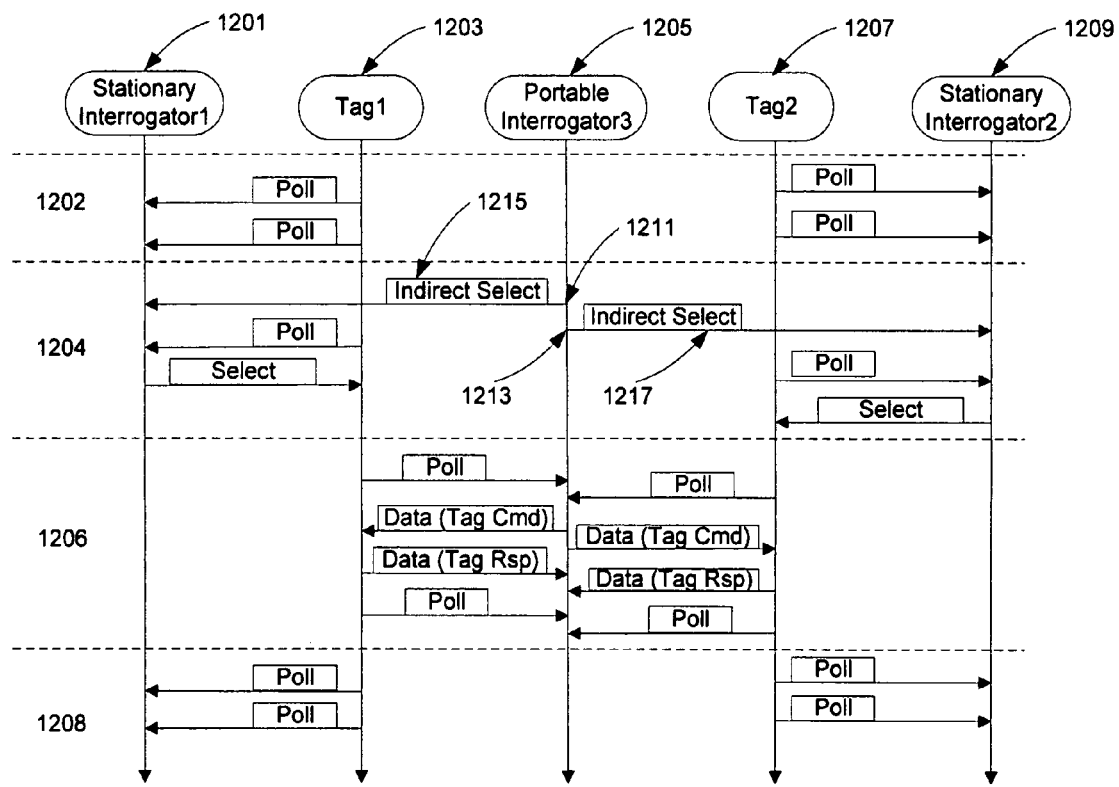
FIG. 12 is a sequence diagram illustrating one embodiment of a portable interrogator taking control of wireless devices already associated with stationary interrogators in an active RFID network.

FIG. 12 is a sequence diagram illustrating one embodiment of a portable interrogator taking control of wireless devices already associated with stationary interrogators in an active RFID network. In one embodiment, the portable interrogator 1205 may perform a process such as process 1100 of FIG. 11. In one embodiment, during time period 1202, a wireless device Tag1 1203 is associated with a stationary interrogator Interrogator1 1201; and a wireless device Tag2 1207 is associated with another stationary interrogator Interrogator2 1209. A tag may send polling packets to its associated interrogator. During time period 1204, according to one embodiment, a portable interrogator Interrogator3 1205 sends indirect selection packets to Interrogator1 1201 at time instance 1211 and Interrogator2 1209 at time instance 1213, respectively. Indirect selection packets 1215 and 1217 may include selection payload, such as in the selection frame 500 of FIG. 5. In response, Interrogator1 1201 and Interrogator2 1209 may send broadcast packets with the selection criteria received from the portable interrogator Interrogator3 1205 to both Tag1 1203 and Tag2 1207 during time period 1204. Subsequently, Tag1 1203 and Tag2 1207 may directly communicate with portable Interrogator3 1205 to complete data transactions during time period 1206 when both of them are selected. In one embodiment, after completing data transactions based on selection criteria, Tag1 1203 and Tag2 1207 resume previous association with Interrogator1 1201 and interrogator2 1209 by sending polling packets to Interrogator1 1201 and Interrogator2 1209 directly during time period 1208.

Figure 13:
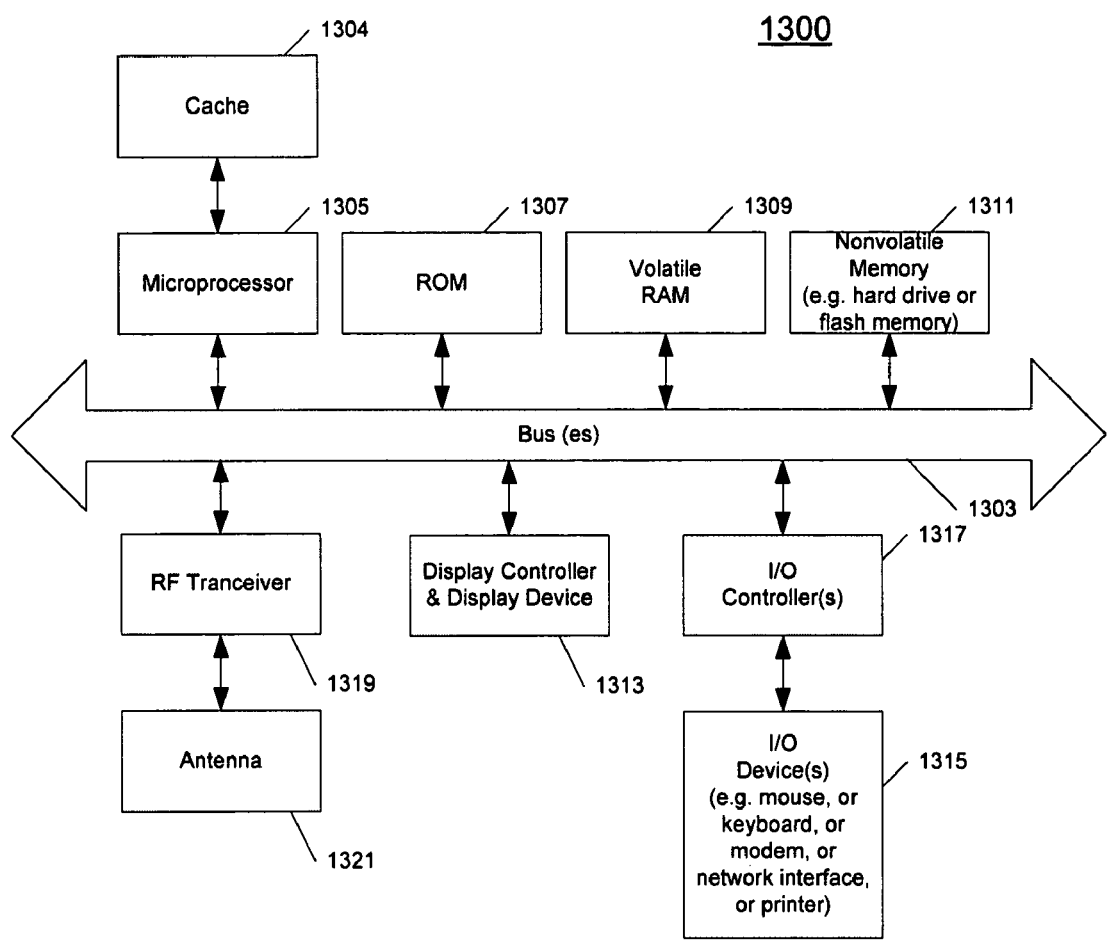
FIG. 13 illustrates one example of a typical computer system which may be used in conjunction with an embodiment of an interrogator described herein.

FIG. 13 shows one example of a computer system which may be used with one embodiment the present invention. For example, the system 1300 may be implemented as a part of the systems shown in FIG. 10. Note that while FIG. 13 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 13, the computer system 1300, which is a form of a data processing system, includes a bus 1303 that is coupled to a microprocessor(s) 1305, a ROM (Read Only Memory) 1307, volatile RAM 1309, and a non-volatile memory 1311. The microprocessor 1303 may retrieve the instructions from the memories 1307, 1309, 1311 and execute the instructions to perform operations described above. The bus 1303 interconnects these various components together and also interconnects these components 1305, 1307, 1309, and 1311 to a display controller and display device 1313 and to peripheral devices such as input/output (I/O) devices 1315 which may be mice, keyboards, modems, network interfaces, printers and other devices, which are well known in the art. Typically, the input/output devices 1315 are coupled to the system through input/output controllers 1317. The volatile RAM (Random Access Memory) 1309 is typically implemented as dynamic RAM (DRAM) which requires power continually in order to refresh or maintain the data in the memory.

Additionally, a wireless transceiver 1319 may be coupled with bus 1303 to provide an interface to a wireless network. The wireless transceiver 1319 may be a radio frequency (RF) transceiver (e.g., an RF transceiver for an RFID wireless network) or a Wi-Fi transceiver for IEEE 802 based wireless network. Transceiver 1319 may be coupled with an antenna system 1321.

The mass storage 1311 is typically a magnetic hard drive or a magnetic optical drive or an optical drive or a DVD RAM or a flash memory or other types of memory systems which maintain data (e.g. large amounts of data) even after power is removed from the system. Typically, the mass storage 1311 will also be a random access memory although this is not required. While FIG. 13 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1303 may include one or more buses connected to each other through various bridges, controllers and/or adapters as is well known in the art.

Figure 14:
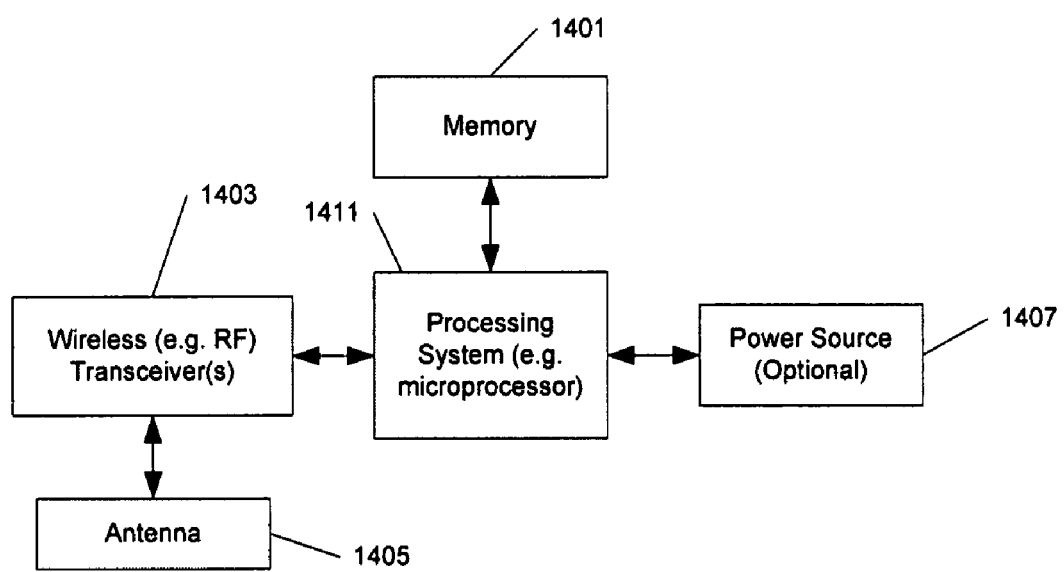
FIG. 14 illustrates an example of a data processing system that may be used with one embodiment of a wireless device in an active RFID network of the present invention.

FIG. 14 shows an example of another data processing system which may be used with one embodiment of the present invention. For example, system 1400 may be implemented as part of system as shown in FIG. 2. The data processing system 1400 shown in FIG. 14 includes a processing system 1411, which may be one or more microprocessors, or which may be a system on a chip integrated circuit, and the system also includes memory 1401 for storing data and programs for execution by the processing system.

The system 1400 also includes one or more wireless transceivers 1403 to communicate with another data processing system, such as the system 1300 of FIG. 13. A wireless transceiver may be a RF transceiver for an active RFID network. An antenna system 1405 may be coupled with the wireless transceiver 1403. Additionally, system 1400 may optionally include a power source 1407. The power source may be a built-in battery or a replaceable battery. In one embodiment, power source 1407 may be based on solar energy source or driven by an external energy source. It will be appreciated that additional components, not shown, may also be part of the system 1400 in certain embodiments, and in certain embodiments fewer components than shown in FIG. 14 may also be used in a data processing system.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method comprising:
   establishing a first association via a wireless network with a first RFID (Radio Frequency Identification) interrogator device, the first association including a first network identifier of the first RFID interrogator device to enable communication with the first RFID interrogator device;
   entering a sleep mode to conserve energy if no wireless communications packets are received from the first RFID interrogator device during a wake up period in a wake up mode with the first association established;
   waking up from the sleep mode to the wake up mode, wherein a wireless communication packet is received via the first association from the first RFID interrogator device in the wake up mode, the wireless communication packet including a selection command and a second network identifier, the selection command indicating a selection by a second RFID interrogator device coupled to the wireless network;
   establishing a second association with the second RFID interrogator device via the wireless network based on the selection, the second association including the second network identifier to enable communication with the second RFID interrogator device, wherein the first association with the first RFID interrogator device ends with the establishment of the second association, wherein the sleep mode is entered with the second association based on whether wireless communication packets are received from the second RFID interrogator device independent of the first RFID interrogator device; and
   in response to receiving a broadcast wireless packet from the second RFID interrogator device in the wake up mode with the second association, sending an RFID data packet to the second RFID interrogator device via the second association.

2. The method of claim 1, wherein the sending comprises selectively communicating with the second RFID interrogator device directly.

3. The method of claim 1, wherein the wireless communication packet includes an expression and wherein the selection is determined based on an evaluation of the expression.

4. The method of claim 1, wherein the second RFID interrogator device is portable.

5. The method of claim 1, wherein the establishment of the second association comprises:
   computing a measurement of a wireless signal associated with the wireless communication packet; and
   comparing the measurement to a threshold value, wherein the comparison indicates a strength of the wireless signal for the establishment of the second association.

6. The method of claim 2, wherein the selectively communicating comprising:
   storing an identification based on the selection with the second RFID interrogator device; and
   sending a response data packet including the identification to the second RFID interrogator device.

7. The method of claim 1, wherein the wireless communication packet is a broadcast data packet.

8. The method of claim 6, wherein the identification is associated with a wireless network address of the second RFID interrogator device.

9. The method of claim 1, further comprising:
   extracting a command from the wireless communication packet; and
   performing a read/write task according to the command.

10. The method of claim 9, wherein the read/write task comprises storing a data associated with the wireless communication packet.

11. The method of claim 9, further comprising:
    sending a polling packet to a first RFID interrogator repetitively based on a polling period; and
    changing the polling period based on the performing the read/write task.

12. The method of claim 9, wherein the performing comprises:
    reading a value from a storage according to a data associated with the communication packet; and
    sending a response data packet to the second RFID interrogator, the response data packet including the identification and the value.

13. A computer implemented method comprising:
    in response to receiving a first data packet wirelessly from a first wireless device, determining if the first wireless device is an interrogator device having a first association established with a second wireless device, the first association to enable communication between the first and second wireless devices, wherein the second wireless device enters a sleep mode to conserve energy if no wireless communications packets are received from the first wireless device during a wake up period in a wake up mode with the first association;
    sending a second data packet including selection criteria wirelessly to the first wireless device if the first wireless device is the interrogator device, the selection criteria to select the second wireless device, wherein the second wireless device wakes up from the sleep mode to the wake up mode to receive the second data packet via the first association from the first wireless device;
    establishing a second association with the second wireless device, based on the selection criteria, the second association to enable communication with the second wireless device, wherein the second association causes the second wireless device to end the first association with the first wireless device, wherein the second wireless device enters the sleep mode with the second association based on whether the second wireless device receives wireless communication packets via the second association independent of the first wireless device; and
    collecting RFID (Radio Frequency Identification) data from a response data packet wirelessly received from the second wireless device in the wake up mode via the second association.

14. The method of claim 13, wherein the establishment of the second association comprises:
    storing an identification received from the second wireless device, the identification identifying the second wireless device.

15. The method of claim 13, wherein the second wireless device is an RFID device associated with the first wireless device, the data packet being a dedicated data packet.

16. The method of claim 13, wherein the collecting comprises:
    computing a measurement of a wireless signal associated with the response data packet.

17. A wireless device system comprising:
- a packet handler module to receive a wireless communication packet via a first association in a wireless network from a first RFID (Radio Frequency Identification) interrogator device, the wireless communication packet including a selection instruction with a network identifier identifying a second RFID interrogator device coupled to the wireless network, wherein the system enters a sleep mode to conserve energy if no wireless communication packets are received from the first RFID interrogator device during a wake up period in a wake up mode with the first association and wherein the system wakes up from the sleep mode to the wake up mode to receive the wireless communication packet;
- a selection module to execute the selection instruction for establishing a second association with the second RFID interrogator device according to the wireless communication packet received from the first RFID interrogator device, the second association including the network identifier to enable communication with the second RFID interrogator, wherein the first association with the first RFID interrogator device ends with the establishment of the second association, wherein the sleep mode is entered with the second association based on whether wireless communication packets are received from the second RFID interrogator device independent of the first RFID interrogator device;
- a transaction module to determine a selection with the second RFID interrogator device based on the execution;
- a storage to store an identification according to the selection with the second RFID interrogator device; and
- a task module coupled with the storage to perform read/write operations to the storage according to the selection.

18. The system of claim 17, further comprising
a signal measurement module to derive an indicator based on a wireless signal associated with the wireless communication packet, wherein the selection depends on the indicator.

19. The system of claim 18, wherein the indicator is a RSSI (Receive Signal Strength Indicator) indicator.

20. A machine-readable non-transitory medium having instructions therein, which when executed by a machine, causes the machine to perform a method, the method comprising:
- establishing a first association via a wireless network with a first RFID (Radio Frequency Identification) interrogator device, the first association including a first network identifier of the first RFID interrogator device to enable communication with the first RFID interrogator device;
- entering a sleep mode to conserve energy if no wireless communications packets are received from the first RFID interrogator device during a wake up period in a wake up mode with the first association established;
- waking up from the sleep mode to the wake up mode, wherein a wireless communication packet is received via the first association from the first RFID interrogator device in the wake up mode, the wireless communication packet including a selection command and a second network identifier, the selection command indicating a selection by a second RFID interrogator device coupled to the wireless network;
- establishing a second association with the second RFID interrogator device via the wireless network based on the selection, the second association including the second network identifier to enable communication with the second RFID interrogator device, wherein the first association with the first RFID interrogator device ends with the establishment of the second association, wherein the sleep mode is entered with the second association based on whether wireless communication packets are received from the second RFID interrogator device independent of the first RFID interrogator device; and
- in response to receiving a broadcast wireless packet from the second RFID interrogator device in the wake up mode with the second association, sending an RFID data packet to the second RFID interrogator device via the second association.

* * * * *